Figure 1A:
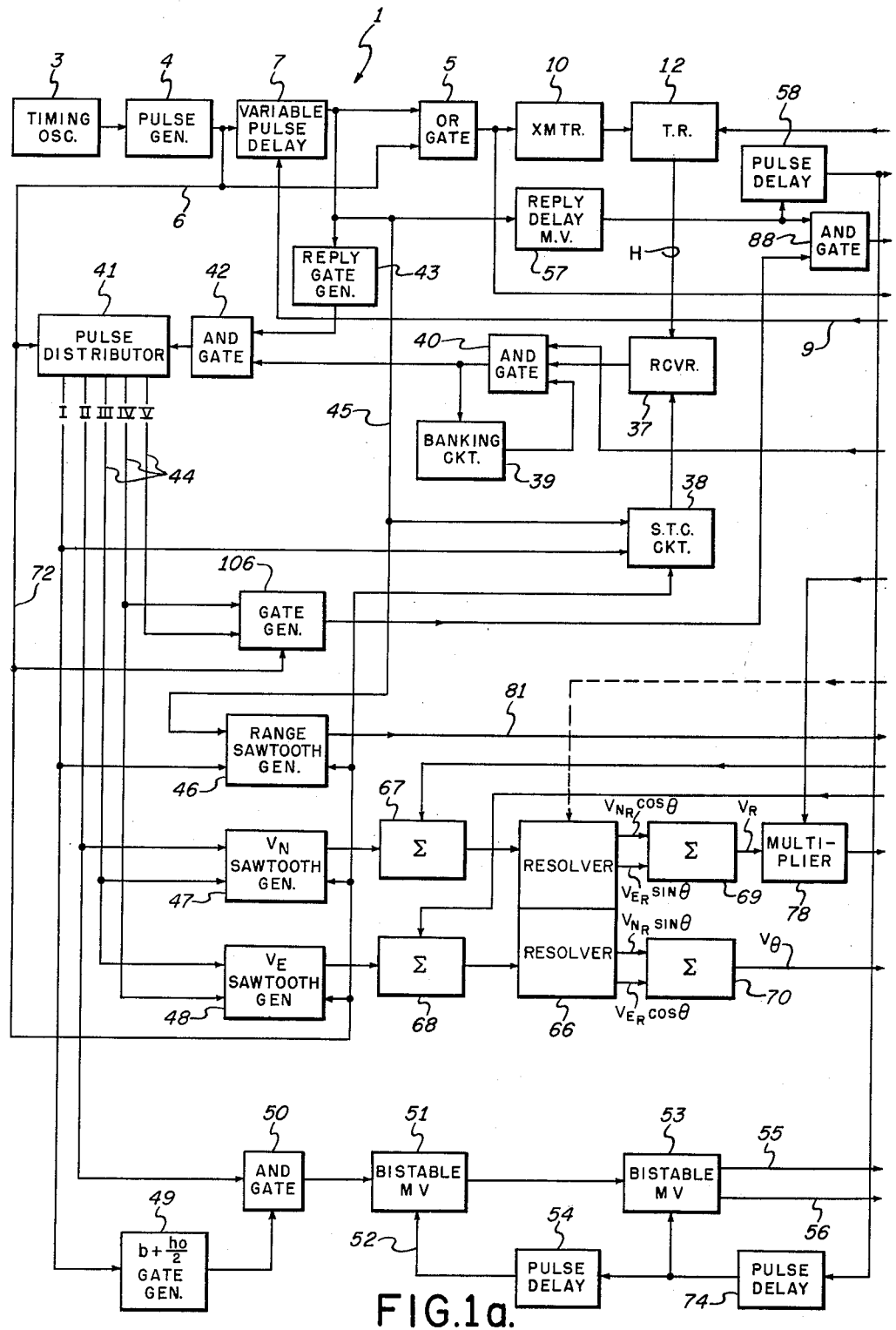

July 9, 1963   D. P. BLOWNEY ETAL   3,097,354
COOPERATIVE COLLISION AVOIDANCE SYSTEM
Filed May 31, 1960   4 Sheets-Sheet 2

3,097,354
Patented July 9, 1963

3,097,354
COOPERATIVE COLLISION AVOIDANCE SYSTEM
David P. Blowney, Huntington Station, Richard S. Brannin, East Williston, John J. Morrone, Elmhurst, James C. Wilcox, Bellerose, and Joseph E. Zupanick, Westbury, N.Y., assignors to Sperry Rand Corporation, Great Neck, N.Y., a corporation of Delaware
Filed May 31, 1960, Ser. No. 32,779
11 Claims. (Cl. 343—6.5)

The need for an adequate airborne collision avoidance system has been apparent for some time. Many systems of varying complexity have been proposed to meet the need. Often, however, the solutions proposed have not fully satisfied minimum contemporary requirements much less have they had the reserve capacity to cope with the ever increasing complexity of the air traffic situation.

More particularly, the density of air traffic and the aircraft speeds that presently must be considered suggest that more than mere proximity warning devices are required to fully meet the problem. Such devices produce a signal for alerting the aircraft pilot when any oncoming obstacle comes within a predetermined minimum range of the protected aircraft. The shortcomings of such an approach to the problem of aircraft collision avoidance are both obvious and numerous. It fails to take into account the relative velocity between the protected aircraft and the obstacle; it fails to provide a prescribed plan for safely maneuvering the protected aircraft clear of the oncoming obstacle; it does not consider that the oncoming obstacle itself generally is an aircraft which is free to maneuver independently of the protected aircraft.

It is a general object of the present invention to avoid and overcome the shortcomings of prior art systems by the provision of a cooperative collision avoidance system wherein all aircraft cooperate with each other in determining whether a dangerous situation has developed.

Another object of the invention is to provide a cooperative aircraft collision avoidance system wherein the determination of a potentially dangerous situation is determined by an exchange of data between the aircraft involved.

It is a further object to provide an aircraft collision avoidance system capable of evaluating simultaneously a multiplicity of potential collision situations.

An additional object is to provide an aircraft collision avoidance system adapted for the rapid evaluation of collision likelihood so that timely avoidance action may be undertaken between high speed aircraft.

Another object is to provide means for ordering programmed maneuvers of each cooperating aircraft after the likelihood of collision has been established.

These and other objects of the present invention, as will appear from a reading of the following specification, are achieved in a preferred embodiment by the provision of an interrogator-transponder system for cooperatively communicating altitude and velocity information between the protected aircraft. Additionally, each aircraft measures the range and bearing of the other aircraft. With this altitude, velocity, range and bearing information, each aircraft computes the degree of collision risk existing and orders, when necessary, compatible avoidance maneuvers for each aircraft to execute.

According to the present invention, one of the criteria used to evaluate the degree of collision threat is the magnitude of the component of the relative velocity between the aircraft involved, which component is directed perpendicular to the line of sight between the aircraft. If the aircraft are traveling on coplanar rectilinear paths at constant speed, a collision could occur only if said velocity component was identically zero. However, the magnitude of the perpendicular velocity component cannot be determined without error. Accordingly, a finite threshold value is established. An unacceptable collision risk is considered to exist if the magnitude of the perpendicular velocity compoent is less than said threshold provided that two other conditions are simultaneously met. These are that the aircraft involved are flying at substantially the same altitude and that the time remaining to closest approach between the aircraft is less than a predetermined desired warning time.

In the unlikely event that one aircraft is simultaneously involved in collision threats with two or more aircraft, each threat is evaluated independently in the same manner. As soon as all of the evaluations have been completed, the collision avoidance action to be undertaken by a given aircraft is determined as follows. If one or more collision threats exist with aircraft which are above the given aircraft in altitude, the given aircraft is commanded to descend. If one or more collision threats exist with aircraft which are lower than the given aircraft in altitude, said given aircraft is commanded to ascend. In the rare event that one or more collision threats exist which are above in altitude and one or more collision threats exist which are below in altitude, a "hold" command is given. In this case, the other aircraft are relied upon to take appropriate avoidance action. As soon as one or the other of the collision threats is removed, then the appropriate "go up" or "go down" avoidance maneuver command is given.

Figure 1B:
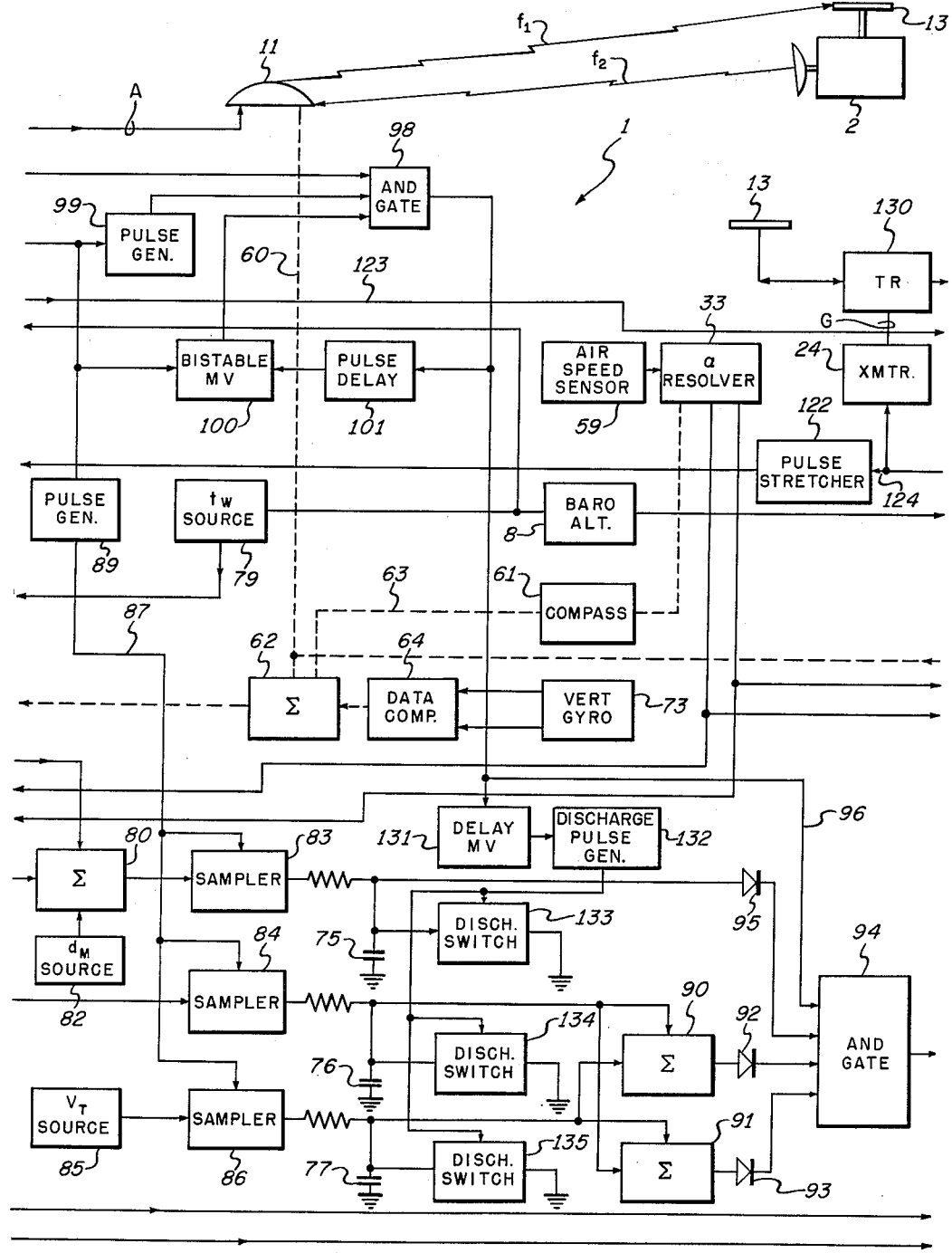
Figure 1C:
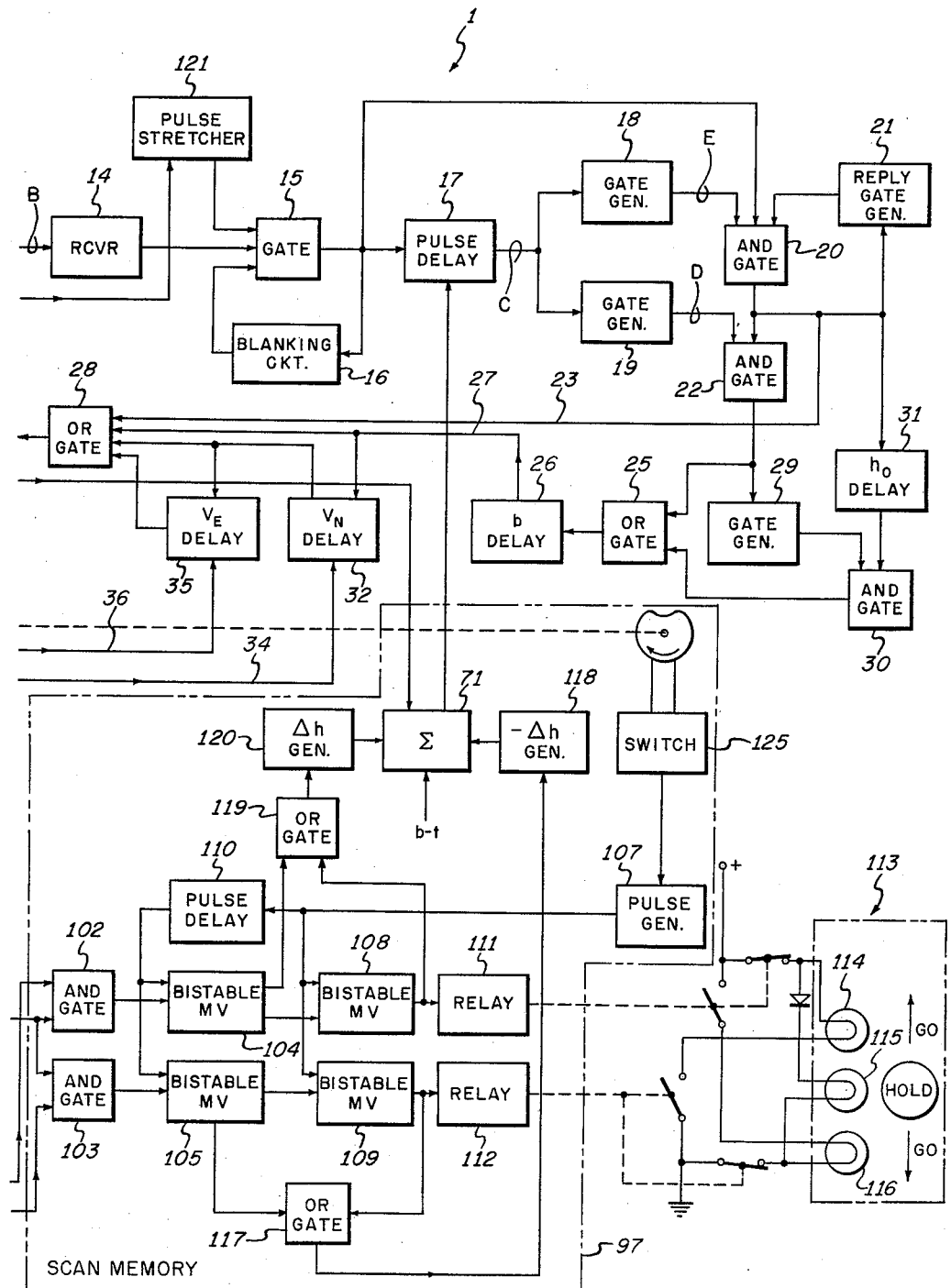
Figure 2:
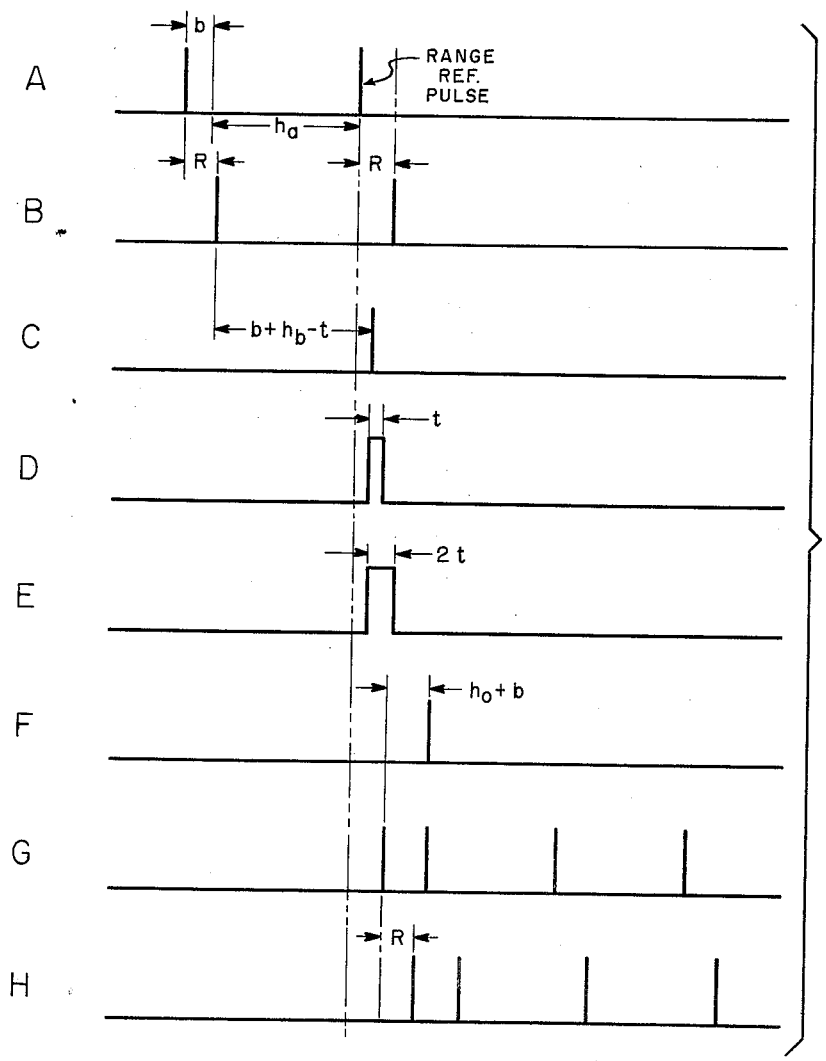

For a more complete understanding of the invention, reference should be had to the following specification and to the drawings of which:

FIG. 1A, FIG. 1B and FIG. 1C together comprise a simplified block diagram of a preferred embodiment of the invention; and FIG. 2 is a series of idealized pulse diagrams useful in explaining the operation of the apparatus of FIGS. 1A, 1B and 1C.

The present invention contemplates that each aircraft is equipped with substantially identical interrogation and transponding apparatus. Thus equipped, each aircraft may interrogate the other and respond to the interrogations of the other. FIGS. 1A, 1B and 1C, when taken together, represent the preferred embodiment of the interrogating and transponding apparatus to be carried by each aircraft. In a simple two-aircraft situation, aircraft A carries the apparatus identified by the numeral 1. Aircraft B carries substantially identical apparatus generally represented by the block designated 2.

For purposes of explanation, it is assumed that aircraft A is interrogating aircraft B. Timing oscillator 3 and pulse generator 4 of aircraft A produce a series of pulses at a suitable repetition interval say, for example, every five milliseconds. This establishes the system repetition rate. Two pulses are transmitted by aircraft A within each repetition interval. The time separation between said two pulses is representative of the altitude of aircraft A. The first of the two pulses is directly applied to OR gate 5 via line 6. The second of the pulses is produced by delaying the first pulse in variable pulse delay 7 by an amount representing the altitude of the interrogating aircraft A. The amount of delay introduced by delay 7 is determined by a control signal derived from barometric altimeter 8 and applied via line 9. The first and second pulses are combined in OR gate 5 and actuate transmitter 10. Transmitter 10 is coupled to antenna 11 by TR 12. The transmitted pulses are radiated directionally by antenna 11 on a first frequency $f_1$ toward aircraft B.

It will be recalled that each aircraft carries identical interrogating and transponding apparatus in the preferred embodiment. However, in the assumed case only the interrogating apparatus of A and the transponding apparatus of B need be considered. In view of this fact and in the interest of simplicity and clarity of exposition, the transponding apparatus indicated as actually being carried by aircraft A will be described on the assumed basis that it is instead part of the aircraft B installation.

The altitude coded pulse pairs are received via the omnidirectional antenna 13 of aircraft B and TR 130 delayed by a time R proportional to range. A representative pulse pair as transmitted by aircraft A and received by aircraft B are depicted in waveforms A and B of FIG. 2. The received pulse pair is amplified and detected in receiver 14 and applied to normally conducting gate 15. The output of gate 15 is fed back to its input via blanking circuit 16. The purpose of circuits 15 and 16 is to eliminate response during a time interval $b$ following each received pulse when ground reflected pulses might reach aircraft B. A typical blanking interval is of the order of 80 microseconds.

The pulse pair passed by gate 15 is applied to the variable delay circuit 17 which introduces a delay proportional to the pressure altitude of aircraft B minus an altitude tolerance factor $t$ plus the blanking delay $b$. The altitude tolerance factor and the blanking delay are both constants. A signal proportional to the pressure altitude of aircraft B is derived from the barometric altimeter 8 of aircraft B. Said signal is combined with a signal representing $b-t$ in summing circuit 71 and applied to delay circuit 17. The first pulse of the delayed pulse pair at the output of delay 17 is represented by C in FIG. 2. Said first delay pulse is simultaneously applied to and actuates gate generators 18 and 19.

Generator 19 produces a pulse of width $t$. Generator 18 produces a pulse of width $2t$ where $2t$ represents the band of altitude centered about aircraft B within which another aircraft, such as aircraft A, may be considered to be a potential collision risk. The function of this portion of the transponder is to determine whether the received interrogation is from another aircraft within said altitude band, and if so, to transmit an encoded reply indicating the sense of the relative altitude of said aircraft. The pulses of width $t$ and $2t$ are respectively shown at D and E of FIG. 2. The received pulse pair at the output of coincidence gate 15 and the $2t$ pulse are applied to AND gate 20. If coincidence occurs (between the $2t$ pulse and the second received pulse), then aircraft A is within the altitude band $2t$ of aircraft B. This is the situation when the second pulse of B FIG. 2 coincides with pulse E of FIG. 2.

Reply gate generator 21 is connected across the input and output terminals of AND gate 20 and produces a pulse of predetermined time interval in response to each output pulse from the AND gate. The output pulse from AND gate 20 is inhibited by a reply gate produced by generator 21 in the event that AND gate 20 has previously passed a pulse within the predetermined time interval. The inhibiting function of generator 21 is to prevent the transponder of aircraft B from replying to other than the first of a number of overlapping interrogations received from a plurality of interrogating aircraft.

The output pulse of gate 20 is applied to AND gate 22 together with the $t$ pulse produced by generator 19. The output pulse from AND gate 20 is simultaneously applied via line 23 and OR gate 28 to transponder transmitter 24 for immediate transmission on frequency $f_2$ via TR 130 and antenna 13 as the first pulse in the reply message to aircraft A. Aircraft A will utilize this first reply pulse to determine the range of aircraft B. The remainder of the reply message of aircraft B consists of three pulses whose spacings represent, respectively, the sense of the altitude difference between aircrafts A and B and the northerly and easterly components of the velocity of aircraft B.

The remaining three of the reply pulses from aircraft B are generated in the following manner. If the output pulse of AND gate 20 also passes through AND gate 22, then the altitude of aircraft B is greater than the altitude of aircraft A. In such a case the pulse passed by AND gate 22 is applied via OR gate 25 to delay 26 which introduces the previously mentioned blanking delay $b$. After delay in circuit 26, the pulse is applied by line 27 and OR gate 28 to actuate transmitter 24 for transmission back to aircraft A as the second reply pulse.

In the event that aircraft B is below aircraft A, then no pulse is passed by AND gate 22. In the absence of a pulse at the output of gate 22, monostable gate generator 29 produces an output signal which renders gate 30 conductive. In this case, the output pulse of AND gate 20, as delayed by an amount $h_0$ in delay 31 passes through conducting gate 30. The pulse passed by gate 30 is applied by OR gate 25 to delay 26 and is transmitted back to interrogating aircraft A as the second reply pulse with a total delay from the first reply pulse of $b+h_0$. This is shown at F of FIG. 2. A separation of $b+h_0$ between the first two reply pulses indicates that aircraft B is at a lower altitude than aircraft A. It should be noted that had aircraft B been above aircraft A, then gate 30 would have been blocked by the action of generator 29. However, a pulse would have passed through AND gate 22 and been transmitted as the second reply pulse with a delay solely of $b$ from the first reply pulse. A separation of $b$ between the first two reply pulses would have indicated that aircraft B was at a higher altitude than aircraft A.

The second reply pulse always appears on line 27 independent of the relative altitude of aircrafts A and B and is delayed in delay 32 as a function of the northerly component of aircraft B's velocity. Delay 32 is controlled by a signal derived from resolver 33 and applied via line 34. Resolver 33 is energized by air speed sensor 59 and driven by compass 61. The delayed output pulse of delay 32 is applied to delay 35 wherein it encounters an additional delay representing the easterly component of aircraft B's velocity. The delay introduced by delay 35 is controlled by a signal derived from resolver 33 and applied via line 36. The delayed output pulses of delays 32 and 35 are applied via OR gate 28 to transmitter 24 for transmission back to aircraft A as the third and fourth pulses of the reply message.

The third and fourth of the reply pulses transmitted back to interrogating aricraft A are respectively delayed as functions of the northerly and easterly components of the velocity of aircraft B. More specifically, the third reply pulse is delayed with respect to the second pulse in accordance with the sum of $b$ (the minimum pulse separation), $V_{max}$ (the known maximum aircraft velocity which the system is designed to handle) and the northerly component of B's velocity. Similarly, the fourth pulse will be delayed from the third pulse by an amount determined by the sum of $b$, $V_{max}$ and the easterly component of B's velocity. A representative four-pulse group of reply pulses is shown at G, FIG. 2, for the case where aircraft B is at a lower altitude than aircraft A; i.e., where the second pulse is delayed from the first pulse by an amount representing $h_0+b$.

The reply pulses received from aircraft B by aircraft A are delayed by an interval R proportional to range. The delayed received pulses are shown at H of FIG. 2. Pulses are received by directional antenna 11 of aircraft A and applied via TR 12 to receiver 37. The sensitivity of receiver 37 is controlled by STC circuit 38 which is actuated by the second of the interrogating pulses from aircraft A which appears on line 45. The receiver sensitivity increases as a function of time starting at the time when said second interrogating pulse is transmitted. The sensitivity is increased to a maximum before the second of the reply pulses is anticipated. The first pulse of B's reply is used to stop the STC and maintain the receiver sensitivity at the corresponding value. This will be more fully described later. The main function of the STC is to permit a single and valid collison computation to be made on an aircraft close enough so that its reply pulses will be received in the side lobes of the interrogating antenna pattern. Without STC, the reply of the responding aircraft would be received on many different bearings. With STC, however, the first reply pulse received in the side lobes will be suppressed because it will arrive at a time when the interrogating receiver gain is low and will not pass the receiver threshold. The remaining three of the reply pulses will be received but will be discarded later because the collision computer will compute on four, and only four, reply pulses. The only time that the first reply pulse from a "close-in" aircraft will pass the receiver threshold is when the reply is being received in the main lobe of the interrogating antenna pattern.

The input to blanking circuit 39 is connected to the output of receiver 37 via AND gate 40. The output of circuit 39 is connected back to the input of gate 40. AND gate 40 conducts when there is an output from receiver 37 and there is no output from blanking circuit 39. The blanking circuit prevents response to ground reflected pulses for a time $b$ immediately following each received pulse; it produces a blanking gate having a duration $b$ following each pulse passed by AND circuit 40.

The output of AND gate 40 is connected to pulse distributor 41 by AND gate 42. A second input to AND gate 42 is derived from reply gate generator 43 which is actuated by the second of the interrogating pulses A of FIG. 2. The reply gate pulse is used to reject all pulses at the output of AND gate 40 which arrive later than the known maximum time for aircraft B to respond to the interrogation of aircraft A. This action minimizes the likelihood of response to spurious signals not related to the interrogation by aircraft A.

The output pulses of AND gate 42 are applied to pulse distributor 41 which is reset at the start of every interrogation cycle by the timing pulses of line 72. Distributor 41 routes each of the output pulses of gate 42 in accordance with its order of occurrence within the interrogation cycle is to a respective one of the output lines 44. Provision is made for a maximum of five pulses per interrogation cycle. The arrival of the fourth pulse indicates that sufficient information has been received to make a collision computation. When an output pulse appears on line IV, a data read-in process is begun as will be described. If a fifth input pulse is received by distributor 41, it indicates that one or more of the input pulses are not responses by aircraft B to the prior interrogation of aircraft A. The fifth output pulse, if any, on line V is used to terminate what otherwise might have been an invalid collision computation.

Assume that a normal four-pulse reply is received from aircraft B. It will be recalled that said four pulses are spaced from each other to represent range, relative altitude, course and speed information. This information is detected as follows. The range is determined by applying the range reference pulse of line 45 (corresponding to the second interrogating pulse shown at A in FIG. 2) to trigger range sawtooth generator 46. The sawtooth produced by generator 46 is terminated by the first reply pulse which is derived from the output of distributor 41 and applied by line I. The terminal value of the sawtooth, which is proportional to range, is maintained at the output of generator 46 until reset by the next following pulse on line 72.

A voltage proportional to the northerly and easterly component of aircraft B's velocity is produced in a similar manner. The voltage representing the northerly component is produced by sawtooth generator 47 which is triggered by the second reply pulse on line II and terminated by the third reply pulse of line III. A voltage proportional to the easterly component of B's velocity is produced by sawtooth generator 48 which is triggered by the third received pulse on line III and terminated by the fourth received pulse on line IV.

Information as to whether B is above or below A is contained in the spacing between the first two reply pulses. The first reply pulse of line I is applied to gate generator 49 which produces an output pulse of a duration determined by $$b + \frac{h_o}{2}$$

It will be recalled that $b + h_o$ represents the fixed delay introduced between the first and second reply pulses when aircraft B is below aircraft A. The output pulse of generator 49 is applied to AND gate 50 along with the second reply pulse of line II. If coincidence occurs at gate 50, then the first and second reply pulses must have been separated only by an interval $b$ indicating that aircraft B is above aircraft A. The coincidence pulse at the output of gate 50 "sets" bistable multivibrator 51. If coincidence does not occur, then aircraft B must be below aircraft A and multivibrator 51 remains in its reset condition in which it is placed at the end of each interrogation cycle. Each time that bistable multivibrator 51 is reset by the pulses of line 52 it transfers its state to bistable multivibrator 53. Multivibrator 51 is reset slightly after multivibrator 53 is reset as determined by pulse delay circuit 54 through which the reset pulse passes.

If a pulse is transferred from multivibrator 51 to multivibrator 53, the multivibrator 53 is "set" into a predetermined state which generates a "go down" maneuver signal on line 56. If multivibrator 53 is not "set" then a "go up" maneuver signal is produced on line 55. It should be noted that the state of multivibrator 53 at any given time indicates the maneuver command derived from the preceding interrogation cycle. Multivibrators 51 and 53 are reset by a pulse derived from the range reference pulse of line 45 as delayed in circuits 57, 58 and 74. The delay interposed by circuits 57, 58 and 74 is sufficient to allow the results of the collision computation to be "read-out" as explained later.

In addition to range (R), northerly component of B's velocity ($V_{N_B}$) and the easterly component of B's velocity ($V_{E_B}$), the quantities required for collision computation are the indicated airspeed of aircraft A ($V_A$), the heading of A (angle $\alpha$) and the true bearing of B with respect to A (angle $\theta$). A voltage proportional to $V_A$ is obtained from airspeed sensor 59 and resolved into the components $V_{N_A}$ and $V_{E_A}$ by resolver 33. The antenna train angle is obtained from the rotating antenna drive represented by dashed line 60. It is combined with the heading angle $\alpha$ derived from compass 61 in mechanical summing means 62 along with a correction term $\theta_c$ to form $\theta$, the true bearing of B with respect to A. The mechanical connection of compass 61 to means 62 is represented by dashed line 63. A mechanical correction signal $\theta_c$ is derived from data compensation means 64.

The correction term $\theta_c$ is required (in the event that scanning antenna 11 is not stabilized in space) to compensate for the errors in measuring relative bearing which occurs when aircraft A pitches or rolls. These errors are similar to the intercardinal tilt error of a directional gyro. The error produced is a function of the pitch and roll signal, the relative bearing of the directional antenna 11 of aircraft A and the relative height of the responding aircraft B. The contribution of the relative height error factor is only significant at short range. Accordingly, the compensation signal $\theta_c$ is made only a function of pitch, roll, and relative bearing in a conventional manner. The pitch and roll signals are generated by vertical gyro 73.

The collision computation is performed continuously by a pair of ganged resolvers 66. The ganged shafts of resolvers 66 are driven by the true bearing $\theta$ output shaft of summing means 62. The inputs to the respective stator windings of ganged resolvers 66 are derived from the outputs of summing circuits 67 and 68. The two inputs of summing circuit 67 are obtained respectively from the output of sawtooth generator 47 (representing $V_{N_B}$) and one output of resolver 33 (representing the northerly components of A's velocity $V_{N_A}$). The two inputs of summing circuit 68 are derived from the output of sawtooth generator 48 (representing $V_{E_B}$) and the other output of resolver 33 (representing the easterly component of A's velocity $V_{E_A}$).

As is well understood, each of the ganged resolvers produces a pair of outputs, one output representing the product of the stator winding excitation signal and the cosine of the shaft displacement angle, the other output representing the product of the stator winding excitation signal and the sine of the same shaft displacement angle. Accordingly, ganged resolvers 66 produce the four indicated outputs, namely, $V_{NR} \cos \theta$, $V_{ER} \sin \theta$, $$V_{NR} \sin \theta$$

and $V_{ER} \cos \theta$. One pair of outputs representing $$V_{NR} \cos \theta$$

and $V_{ER} \sin \theta$ are jointly applied to summing circuit 69. The other pair of outputs representing $V_{NR} \sin \theta$ and $V_{ER} \cos \theta$ are jointly applied to summing circuit 70. The output of summing circuit 69 represents $V_R$ whereas the output of summing circuit 70 represents $V_\theta$. $V_R$ is the relative velocity component directed along the line of sight beween aircrafts A and B. $V_\theta$ is the component of the relative velocity between aircraft A and B directed along a perpendicular to the line of sight between the two aircraft.

As previously stated, a collision risk is deemed to exist, in accordance with the present invention, if the magnitude of the relative velocity component $V_\theta$ is less than a predetermined minimum or threshold value $V_T$, the computed time remaining to closest approach between aircraft A and B is less than a pre-established minimum value $t_W$ and the aircraft are in the same altitude band. The fulfillment of the second condition is determined from the relationship $V_R t_W + d_m - R = d_W$. The distance $d_m$ is taken into account to establish a minimum miss or clearance distance between aircraft A and B should $V_R$ be very small in value which would occur if the aircraft were traversing substantially parallel courses. The miss distance $d_m$ represents a protective boundary in space around the interrogating aircraft, in this case aircraft A. The quantity $d_W$ is the distance that the responding aircraft will be from said boundary in $t_W$ seconds. When the sign associated with the quantity $d_W$ in the above expression changes from negative to positive (when the magnitude of present radial range R is less than the magnitude of $V_R t_W + d_m$), then the condition that the computed time to closest approach is less than $t_W$ is considered to be satisfied. The inclusion of the distance $d_m$ in the expression also ensures that the computed time to closest approach is always less than the actual time to provide a margin of safety.

It is well recognized that for a given pulse repetition rate and a given azimuth scan rate, the number of target echo signals detected by a given radar receiver varies as a function of target range. Moreover, each echo signal is received at an azimuth angle differing from that of the preceding "echo" by a small angular amount determined by the angular advance of the scanning interrogating antenna between echoes. In terms of the present collision avoidance system, each echo corresponds to a reply to a prior interrogation. Each reply results in computed values of $V_\theta$ and $d_W$ being generated. Consequently, each successive computation will be based on different relative bearing measurement. The difference or error in the successive computed values is proportional to the angle between the line of sight between aircraft A and B and the beam center of A's antenna when B's reply is received. These errors, however, can be greatly reduced by averaging all of the values of $V_\theta$ and $d_W$ which are computed for a particular aircraft. In the present system, the process of averaging is provided for by an equivalent signal summing process.

The values of $d_W$, $V_\theta$ and $V_T$ are summed, respectively, in capacitors 75, 76 and 77. The charges accumulated on the capacitors are proportional to the values of signals representing $d_W$, $V_\theta$ and $V_T$ and the duration of a "read-in" pulse.

As was previously stated, the signal representing $V_R$ is produced at the output of summing circuit 69. Said signal is applied to a first input of a conventional analog multiplier circuit 78, the other input of which is derived from $t_W$ source 79. The signal output of circuit 78 representing the product $V_R t_W$ is applied to a first input of summing circuit 80 wherein it is algebraically combined with the signal appearing on line 81 representing range R and a signal obtained from $d_m$ signal source 82. The output signal of circuit 80 represents the value $d_W$ in accordance with the expression $$V_R t_W + d_m - R = d_W$$

The resultant signal representing $d_W$ is applied to a first input of sampler 83. Similarly, the signal proportional to $V_\theta$ at the output of circuit 70 is applied to a first input of sampler 84 and a signal generated by $V_T$ source 85 is applied to a first input of sampler 86.

All three sampler circuits are actuated by the same read-in pulse appearing on line 87. The read-in pulse is derived from the range reference pulse of line 45 which is delayed via delay multivibrator 57 by a time which is greater than the known maximum length reply time. This allows sufficient time for the computation of $d_W$ and $V_\theta$. The fourth output of distributor 41 appearing on line IV triggers gate generator 106 to produce a pulse for actuating AND gate 88. The delayed range reference pulse output of multivibrator 57 passes through gate 88 if gate 88 is then actuated. Gate 88 remains actuated (conductive) until generator 106 is either reset by the next following pulse on line 72 or by a fifth reply pulse output appearing on output line V of counter 41. If such a fifth reply pulse appears, as in the event that more than one aircraft were replying, then gate 88 is closed (rendered nonconductive) before the delayed range reference pulse output of multivibrator 57 can pass through. In this case, an invalid computation is precluded through the failure to generate the required read-in pulse. In the absence of a fifth reply pulse, the delayed range reference pulse output of multivibrator 57 passes through AND gate 88 and triggers generator 89 to produce the read-in pulse on line 87.

The charge on capacitor 75 represents $\Sigma d_W$. The charge on capacitor 76 representing $\Sigma V_\theta$ is compared to the charge on capacitor 77 representing $\Sigma V_T$ in summing circuits 90 and 91. In the event that the absolute value of $\Sigma V_\theta$ is greater than the absolute value of $\Sigma V_T$, a signal denoting this fact is passed by one of the diodes 92 and 93 and applied to a first inhibiting input of AND gate 94. The signal (if positive) developed across capacitor 75 is applied via diode 95 to another input of gate 94. Finally, a "read-out" pulse appearing on line 96 is also applied to gate 94. The read-out pulse passes through gate 94 in the event that $\Sigma d_W$ is positive and if the absolute value of $\Sigma V_\theta$ is less than $\Sigma V_T$, i.e., there is no positive output signal from circuits 90 and 91.

The primary function of the read-out pulse of line 96 is to transfer a maneuver command, either "go up" or "go down," to scan memory 97 when the computation indicates that a collision risk exists. The read-out pulse is generated only after the interrogating beam passes the position of the responding aircraft. It is assumed that the beam has passed the responding aircraft position when one reply is missing after one or more replies have been received. Accordingly, a read-out pulse is generated when a read-in pulse is not generated, immediately after one or more read-in pulses have been generated.

The read-out pulse is derived from the delayed range reference pulse output of multivibrator 57. After an additional short delay interposed by delay 58, said pulse is applied to AND circuit 98. The pulse will pass through AND circuit 98 and become the read-out pulse if it is not inhibited by an output pulse from generator 99 and if multivibrator 100 has not been "set." Generator 99 and multivibrator 100 are both triggered by the output pulse of gate 88 which triggers generator 89 to produce the read-in pulse. Thus, if a read-in pulse had been generated but is no longer being generated, then the read-out pulse will be passed by gate 98. Said output pulse is applied via delay 101 to reset multivibrator 100 for the closing of AND gate 98.

The read-out pulse of line 96 will pass through either AND gate 102 or AND gate 103 depending on whether a "go up" or "go down" maneuver command signal was generated at the output of multivibrator 53. If, for example, a go up command was generated, then line 55 is energized and the read-out pulse will pass through AND gate 102. The read-out pulse is then "stored" temporarily in multivibrator 104. The output signal of gate 102 sets multivibrator 104; similarly, an output signal of gate 103 would set multivibrator 105. When either multivibrator is set it remains in that condition until the end of the current interrogating antenna scan cycle which is deemed to occur when the rotating beam scans by the tail of interrogating aircraft A. If more than one aircraft is on a collision course with the interrogating aircraft, then additional read-out pulses will be passed by gate 94 and will set either or both multivibrators 104 and 105. Therefore, the setting of multivibrators 104 and 105 indicates that one or more collision possibilities exist with aircraft below and above, respectively, the interrogating aircraft.

It should be noted that a new collision computation is initiated following each read-out pulse passage through gate 94. For this purpose, each read-out pulse is applied via delay multivibrator 131 to pulse generator 132. The pulse produced by generator 132 simultaneously actuates switches 133, 134 and 135 to discharge capacitors 75, 76 and 77.

As the interrogating beam passes by the tail of the interrogating aircraft, a pulse is generated by generator 107 to immediately reset multivibrators 108 and 109 and, after a short delay introduced by circuit 110, the reset multivibrators 104 and 105. Pulse generator 107 is triggered by a cam actuated switch 125 driven by antenna drive 60. With the resetting of multivibrators 104 and 105, any "go up" or "go down" command signal sotred therein is transferred to a correspondingly connected one of multivibrators 108 and 109. Multivibrators 108 and 109 are reset slightly before multivibrators 104 and 105 to remove the results of the computations made during the previous scan cycle.

When multivibrator 108 is set, it produces an output signal which actuates relay 111. Similarly, the setting of multivibrator 109 actuates relay 112. The contacts asociated with the relays selectively energize the visual display 113. The contacts are connected in circuit in accordance with conventional logical techniques so that:

(1) Indicator 114 is energized when relay 111 is actuated and relay 112 is not actuated;
(2) Indicator 115 is energized when both relays 111 and 112 are actuated; and
(3) Indicator 116 is energized when relay 112 is actuated and relay 111 is not actuated.

The energization of indicators 114, 115 and 116 respectively produce a go up, hold and go down visual command to the pilot of the interrogating aircraft. In the event that collision risks exist both above and below the interrogating aircraft, then both relays 111 and 112 are actuated resulting in a "hold" visual command to the interrogating aircraft. In this event, the other aircraft are relied upon to initiate the proper avoidance maneuver. As soon as one or the other of the collision risks is removed subsequent to such maneuver, then an appropriate "go up" or "go down" visual command is given to the interrogating aircraft pilot to avoid the collision threat with the remaining aircraft.

In accordance with the preferred embodiment of the present invention, the avoidance maneuver undertaken by the aircraft pilots in response to the visual commands of display 113 are simple "pull ups" and "push overs," i.e., maneuvers limited to the vertical plane. No turns or changes in course are involved. The removal of a potential collision risk as a result of the commanded pull ups or pushovers is indicated by the deenergization of an appropriate one of indicators 114 and 116. This occurs when the difference in altitude between the interrogating and transponding aircraft involved increases beyond the altitude increment represented by the duration of the $2t$ pulse of FIG. 2E whereupon no further replies are transmitted by the transponding aircraft in response to interrogations. When the interrogating and transponding aircraft have achieved the predetermined altitude separation, the visual maneuver command signals disappear informing the pilots involved that they may resume level flight. After a short interval, the pilots may resume their originally assigned altitudes.

The present invention also takes into account the possibility that the interrogating and transponding aircraft may be flying at substantially the same altitude. In such an event, the possibility exists that because of intrinsic small errors in the altitude coding and decoding of the transmitted signals, each aircraft's visual display might command a maneuver opposite to the one which should have been ordered. That is, it is possible that the pilot of the aircraft actually above the other will receive a "pushover" maneuver command. However, the maneuver command signals are given while the aircraft still are sufficiently separated in range to permit clearance by a safe margin so long as the interrogating and transponding aircraft actually initiate opposite maneuvers. Thus, the relative altitude ambiguity is resolved by ensuring that opposite avoidance maneuver commands always will be displayed to the respective pilots.

The opposite maneuver signals are generated in the following manner. Whenever a maneuver command is stored in either of the multivibrators 105 and 109 or in either of the multivibrators 104 and 108, the altitude used in the transponder decoder is modified immediately. The output signals of multivibrators 105 and 109 are applied via OR gate 117 to $-\Delta h$ generator 118. Similarly, the output signals of multivibrators 104 and 108 are applied via OR gate 119 to actuate $\Delta h$ generator 120. Generators 118 and 120 produce output signals of equal magnitude but opposite sense which are applied to summing circuit 71, the output of which as previously described controls the delay introduced by delay circuit 17.

Thus, the interrogating aircraft (which is the first aircraft to receive a maneuver command indication) will change its transponder altitude decoding reference voltage (output of summing circuit 71) to represent a new altitude in the direction of the commanded maneuver. Assuming that a "pushover" maneuver command is given, the decoding reference voltage is changed to introduce a lesser delay in circuit 17. When said first aircraft is interrogated at some later time, the first two pulses of its reply transmission will be separated by an amount representing the sign of the relative altitude based upon the shifted altitude decoding reference signal as modified by the factor $\Delta h$.

Of course, the shift in the decoding reference (magnitude of $\Delta h$) must be of sufficient magnitude to resolve the ambiguity attributable to system errors. The pertinent errors which could cause, in the marginal case, both aircraft to receive the same maneuver command are the coding and decoding errors of the interrogator and transponder, respectively. Other errors such as, for example, errors in transforming the static pressure into a corresponding altitude voltage do not contribute to height ambiguity. However, the last-named errors might cause the higher aircraft to receive a pushover command and the lower aircraft to receive a pull up command when both aircraft are at approximately the same altitude. As previously mentioned, this eventuality is taken into account by ensuring that the opposite maneuver commands are given while the aircraft are still sufficiently separated in range to safely avoid each other. More particularly, the necessary allowance is made by assigning a sufficient value to the magnitude of the $t_W$ signal produced by source 79.

It should be noted that the delay introduced between the two pulses transmitted by the interrogating aircraft determines the altitude region within which any responding aircraft must lie. When said delay also represents the altitude of the interrogating aircraft, then responses will be received only from aircraft at approximately the same altitude. It may be desirable, however, in anticipation of an intended maneuver to first interrogate aircraft situated at the new altitude toward which the interrogating aircraft is to be flown. In this manner, the collision risk which would be encountered can be assessed to determine whether the intended maneuver may be safely executed. Such risks may be evaluated merely by adding an "altitude search" signal of appropriate polarity to the signal derived from altimeter 8 and then applying the resultant signal to variable pulse delay 7. A delay corresponding to the altitude region to be searched would then be introduced between the interrogating pulses.

From the preceding specification, it can be seen that the objects of the present invention have been achieved by the provision of interrogating and transponding apparatus by which aircraft flying within a predetermined altitude band interchange altitude and velocity information, measure the range and bearing of each other, and compute the degree of collision risk based on the interchanged and computed factors. Each risk is evaluated separately and the result of each evaluation is stored until all risks have been taken into account. The storage period is determined by the azimuthal rotation period of the scanning directional antenna which is part of the substantially identical transponding and interrogating apparatus carried by each aircraft.

At the completion of each evaluation period, the stored results are displayed in terms of the avoidance maneuver, if any, to be undertaken in view of all of the evaluated collision risks. Provision is made for ensuring that opposite pull up and pushover maneuvers will be respectively undertaken by each pair of aircraft involved in potential collision in all cases where both aircraft are commanded to maneuver.

It should be understood that the apparatus required for producing a maneuver command signal at a single aircraft comprises transmitting apparatus carried by the interrogating aircraft, transponding apparatus carried by another aircraft and receiving apparatus carried by the interrogating aircraft for evaluating the potential collision risk. As a practical matter, however, the present invention contemplates that each aircraft carry substantially identical interrogating and transponding apparatus. In this way, each aircraft may interrogate the others and respond to the interrogations of the others to produce simultaneously compatible avoidance maneuver command indications at each aircraft. One consequent feature is that the interrogations from a given aircraft will be received by the omnidirectional transponder antennas of all the aircraft including the given aircraft. Accordingly, means are provided for deactuating the transponder receiver of a given aircraft during the time that interrogating transmissions are sent from the same aircraft. This is accomplished through the action of pulse stretchers 121 and 122. Pulse stretcher 121 is actuated by the interrogator transmitter triggers appearing on line 123. Pulse stretcher 122 is actuated by the transponder transmitter triggers appearing on line 124. Each pulse stretcher produces an output pulse for the blocking of a respective one of AND gates 15 and 40 during the time interval that the self-interrogating transmissions are received by antennas 13 and 11, respectively.

It will be observed by those skilled in the art that certain ordinary design details have been omitted from the simplified block diagram of FIGS. 1A and 1B. For example, various alternating to direct current signal transformations may be required, depending upon the specific instrumentation selected, for performing the indicated analog computations. Devices for effecting such transformations are well known and have been omitted for the sake of simplicity of exposition.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for commanding the maneuver to be undertaken by a given craft to avoid collision with each of other craft, said apparatus comprising means for developing first and second signals respectively representing first and second components of the relative velocity between said given craft and each said other craft, said first component representing the portion of said relative velocity which is directed along the line of sight between said given and each said other craft, said second component representing the portion of said relative velocity which is directed along a line perpendicular to said line of sight, means for developing a third signal representing the range between said given and each said other craft as measured along said line of sight, signal computing means, means for applying said first and third signals to said computing means, said computing means providing an output signal when the nearest approach of each said other craft to said given craft will be within a predetermined future time, signal combining means, means for applying said output signal and said second signal to said combining means to produce an actuating signal in response to said output signal when the magnitude of said second signal is below a predetermined value, first and second signal coincidence means, means for applying said actuating signal to both said coincidence means, means for developing a fourth signal representing the sense of the maneuver to be taken by said given craft to avoid collision with each said other craft, said fourth signal being applied to one of said coincidence means in accordance with the sense represented by said fourth data signal, said one of said coincidence means producing an output signal in the presence of said actuating signal and the respectively applied fourth signal, first and second signal storage means for respectively producing first and second control signals, each said storage means being connected to the output of a respective one of said coincidence means, first, and second and third signal utilization means, and means connected to each said storage means and to each said utilization means for selectively actuating said first, second and third utilization means whereby said first utilization means is actuated in response to said first control signal, said third utilization means is actuated in response to said second control signal and said second utilization means is actuated in response to both said first and second control signals.

2. Apparatus for commanding the maneuver to be undertaken by a given craft to avoid collision with each of other craft, said apparatus comprising means for developing first and second signals respectively representing first and second components of the relative velocity between said given craft and each said other craft, said first component representing the portion of said relative velocity which is directed along the line of sight between said given and each said other craft and said second component representing the portion of said relative velocity which is directed along a line perpendicular to said line of sight, means for developing a third signal representing the range between said given and each said other craft as measured along said line of sight, signal computing means, means for applying said first and third signals to said computing means, said computing means providing a first output signal when the nearest approach of each said other craft to said given craft will be within a predetermined future time, signal combining means, means for applying said first output signal and said second signal to said combining means to produce an actuating signal in response to said output signal when the magnitude of said second signal is below a predetermined value, first and second signal coincidence means, means for applying said actuating signal to both said coincidence means, means for developing a fourth signal representing the sense of the maneuver to be taken by said given craft to avoid collision with each said other craft, said fourth signal being applied to one of said coincidence means in accordance with the sense represented by said fourth data signal, said one of said coincidence means producing a second output signal in the presence of said actuating signal and the respectively applied fourth signal, and first and second signal utilization means connected to the outputs of said coincidence means.

3. Apparatus for producing a control signal for initiating a maneuver by a given craft to avoid collision with each of other craft, said apparatus comprising means for developing first and second signals respectively representing first and second components of the relative velocity between said given craft and each said other craft, said first component representing the portion of said relative velocity which is directed along the line of sight between said given and each said other craft and said second component representing the portion of said relative velocity which is directed along a line perpendicular to said line of sight, means for developing a third signal representing the range between said given and each said other craft as measured along said line of sight, signal computing means, means for applying said first and third signals to said computing means, said computing means providing an output signal when the nearest approach of each said other craft to said given craft will be within a predetermined future time, means for developing a fourth signal representing the sense of the maneuver to be taken by said given craft to avoid collision with each said other craft, signal combining means, means for applying said output signal, said second signal and said fourth signal to said signal combining means, said combining means producing said control signal in response to said output signal and said fourth signal when the magnitude of said second signal is below a predetermined value, the sense of said control signal corresponding to the sense represented by said fourth signal.

4. Apparatus for producing a control signal for initiating a maneuver by a given craft to avoid collision with each of other craft, said apparatus comprising means for developing first and second signals respectively representing first and second components of the relative velocity between said given craft and each said other craft, said first component representing the portion of said relative velocity which is directed along the line of sight between said given and each said other craft and said second component representing the portion of said relative velocity which is directed along a line perpendicular to said line of sight, means for developing a third signal representing the range between said given and each said other craft as measured along said line of sight, signal computing means, means for applying said first and third signals to said computing means, said computing means providing an output signal when the nearest approach of each said other craft to said given craft will be within a predetermined future time, signal combining means, means for applying said output signal and said second signal to said signal combining means, said combining means producing said control signal in response to said output signal when the magnitude of said second signal is below a predetermined value.

5. Apparatus for commanding the maneuver to be undertaken by a first aircraft to avoid collision with each of other aircraft, said apparatus comprising means carried by said first aircraft for transmitting to other aircraft electromagnetic energy having a predetermined characteristic representing the altitude of said first aircraft, means carried by each said second aircraft for receiving said energy and for developing in response thereto a first signal representing the altitude information conveyed by said energy, means for generating a second signal representing the altitude of said second aircraft, signal comparator means, means for applying said first and second signals to said comparator means, said comparator means producing an output signal when said first and second signals differ from each other by less than a predetermined amount, said output signal having a characteristic representing the sense of the altitude difference between said first and second aircraft, means for transmitting said output signal back to said first aircraft, means carried by said first aircraft for detecting said transmitted output signal to extract the altitude information conveyed thereby, said last-named means producing a first control signal when the altitude of said second aircraft is higher than that of said first aircraft and producing a second control signal when the altitude of said second aircraft is lower than that of said first aircraft, first means coupled to said means for detecting for storing said first control signal, second means coupled to said means for detecting for storing said second control signal, first, second and third signal utilization means, and means connected to both said control signal storing means and to each said utilization means for selectively applying said first control signal to said first utilization means, said second control signal to said third utilization means, and both said first and second control signals to said second utilization means.

6. Apparatus comprising continuously scanning means carried by a first aircraft for directionally transmitting to a second aircraft a pair of pulsed signals, the time interval between said pair of signals representing the altitude of said first aircraft, means carried by said second aircraft for receiving said pulsed signals and developing in response thereto a first signal representing the time interval between said pair of signals, means for generating a second signal representing the altitude of said second aircraft, signal comparator means, means for applying said first and second signals to said comparator means, said comparator means producing a third signal synchronously with one of said pair of received pulsed signals when said first and second signals differ from each other by less than a predetermined amount, said comparator also producing a fourth signal time spaced from said third signal by an amount representing the sense of the difference between said first and second signals, means for transmitting said third and fourth signals back to said first aircraft, and means carried by said first aircraft for directionally receiving and detecting said transmitted output signal.

7. Apparatus comprising continuously scanning means carried by a first aircraft for directionally transmitting to a second aircraft electromagnetic energy having a predetermined characteristic representing the altiude of said first aircraft, means carried by said second aircraft for receiving said energy and for developing in response thereto a first signal representing the altitude information conveyed by said energy, means for generating a second signal representing the altitude of said second aircraft, signal comparator means, means for applying said first and second signals to said comparator means, said comparator means producing a third signal when said first and second signals differ from each other by less than a predetermined amount, said comparator also producing a fourth signal time spaced from said third signal by an amount representing the sense of the difference between said first and second signals, means for transmitting said third and fourth signal back to said first aircraft and means carried by said first aircraft for directionally receiving and detecting said transmitted output signal.

8. In a cooperative aircraft collision avoidance system wherein one aircraft carries substantially identical transmitting and receiving apparatus for generating and transmitting a maneuver command signal to another aircraft and for receiving a maneuver command signal from the other aircraft, means for generating said maneuver command signal comprising means for receiving a first signal representing the altitude of a first aircraft, controllable means for producing a second signal representing the altitude of a second aircraft, means for comparing said first and second signals to produce said command signal when said first and second signals differ from each other by less than a predetermined amount, means for producing a control signal in response to the command signal received from said first aircraft, and means for applying said control signal to said controllable means for producing said second signal whereby the value of said second signal is modified to represent a new altitude toward which said second aircraft is ordered to maneuver.

9. Apparatus for computing first and second components of the relative velocity between said first and second vehicles, said first velocity component being directed along the line of sight between said vehicles and said second velocity component being directed along a line perpendicular to said line of sight, said apparatus comprising a first transmitter carried by said first vehicle for sending a first signal to said second vehicle, said signal having a predetermined character, means carried by said second vehicle for receiving said signal and for distinguishing said predetermined character thereof to produce an actuating signal, a second transmitter carried by said second vehicle for sending back to said first vehicle second signals having distinctive characteristics representing the northerly and easterly components of the velocity of said second vehicle, means for applying said actuating signal to said second transmitter for the actuation thereof, means carried by said first vehicle for receiving said second signals and for developing in response thereto first and second data signals representative of the northerly and easterly velocity information conveyed by said second signals, means carried by said first vehicle for developing third and fourth data signals respectively representing the northerly and easterly velocity components of said first vehicle, first and second signal summing circuits, means for applying said first and third data signals to said first circuit, means for applying said second and fourth data signals to said second circuit, said first circuit producing a first output signal representing the northerly component of the resultant relative velocity between said first and second vehicles, said second circuit producing a second output signal representing the easterly component of the resultant relative velocity between said first and second vehicles, means for developing a fifth data signal representing the true bearing of said second vehicle relative to said first vehicle, a signal resolver, means for applying said first and second output signals and said fifth data signal to said resolver, said resolver producing first and second pairs of corresponding output signals, third and fourth signal summing circuits, and means for applying each pair of corresponding output signals to a respective one of said third and fourth signal summing circuits.

10. Apparatus for producing an alerting signal indicating an approaching collision between first and second vehicles, said apparatus comprising means carried by said first vehicle for transmitting an interrogating signal of a predetermined character to said second vehicle, means carried by said second vehicle for receiving said signal and for distinguishing said predetermined character thereof to produce an actuating signal, means carried by said second vehicle for transmitting back to said first vehicle a predetermined number of pulsed signals, the spacing between said pulsed signals representing the northerly and easterly components of the velocity of said second vehicle, means for applying said actuating signal to the last-named transmitting means for the actuation thereof, means carried by said first vehicle for receiving the transmitted pulsed signals and for developing in response thereto first and second data signals representative of the northerly and easterly velocity information conveyed by said pulsed signals, means for developing third and fourth data signals respectively representing the northerly and easterly components of velocity of said first vehicle, first and second signal summing circuits, means for applying said first and third data signals to said first circuit, means for applying said second and fourth data signals to said second circuit, said first circuit producing a first output signal representing the northerly component of the resultant relative velocity between said first and second vehicles, the second circuit producing a second output signal representing the easterly component of the resultant relative velocity between said first and second vehicles, means for developing a fifth data signal representing the true bearing of said second vehicle relative to said first vehicle, a signal resolver, means for applying said first and second output signals and said fifth data signal to said resolver, said resolver producing first and second pairs of corresponding output signals, third and fourth signal summing circuits, means for applying each pair of corresponding output signals to a respective one of said third and fourth signal summing circuits, said third summing circuit producing a third output signal representing the portion of said resultant relative velocity which is directed along the line of sight between said first and second vehicles and said fourth summing circuit producing a fourth output signal representing the portion of said resultant relative velocity which is directed along a line perpendicular to said line of sight, means for developing a sixth data signal representing the range between said first and second vehicles as measured along the line of sight, signal computing means, means for applying said third output signal and said sixth data signal to said computing means, said computing means providing a fifth output signal when the nearest approach of said second vehicle to said first vehicle will be in a predetermined future time, signal combining means, and means for applying said fourth and fifth output signals to said combining means, said combining means producing said alerting signal in response to said fifth output signal when the magnitude of said fourth output signal is below a predetermined value.

11. Apparatus for producing an alerting signal indicating an approaching collision between first and second vehicles, said apparatus comprising means carried by said first vehicle for transmitting an interrogating signal of a predetermined character to said second vehicle, means carried by said second vehicle for receiving said signal and for distinguishing said predetermined character thereof to produce an actuating signal, means carried by said second vehicle for transmitting back to said first vehicle a predetermined number of pulsed signals, the spacing between said pulsed signals representing the northerly and easterly components of the velocity of said second vehicle, means for applying said actuating signal to the last-named transmitting means for the actuation thereof, means carried by said first vehicle for receiving the transmitted pulsed signals and for developing in response thereto first and second data signals representative of the northerly and easterly velocity information conveyed by said pulsed signals, means coupled to the receiving means of said first vehicle for counting the number of received pulsed signals and for producing a control signal when the counted number is in excess of said predetermined number, means for developing third and fourth data signals respectively representing the northerly and easterly components of the velocity of said first vehicle, first and second signal summing circuits, means for applying said first and third data signals to said first circuit, means for applying said second and fourth data signals to said second circuit, said first circuit producing a first output signal representing the northerly component of the resultant relative velocity between said first and second vehicles, said second circuit producing a second output signal representing the easterly component of the resultant relative velocity between said first and second vehicles, means for developing a fifth data signal representing the true bearing of said second vehicle relative to said first vehicle, a signal resolver, means for applying said first and second output signals and said fifth data signal to said resolver, said resolver producing first and second pairs of corresponding output signals, third and fourth signal summing circuits, means for applying each pair of corresponding output signals to a respective one of said third and fourth signal summing circuits, said third summing circuit producing a third output signal representing the portion of said resultant relative velocity which is directed along the line of sight between said first and second vehicles and said fourth summing circuit producing a fourth output signal representing the portion of said resultant relative velocity which is directed along a line perpendicular to said line of sight, means for developing a sixth data signal representing the range between said first and second vehicles as measured along the line of sight, signal computing means, means for applying said third output signal and said sixth data signal to said computing means, said computing means providing a fifth output signal when the nearest approach of said second vehicle to said first vehicle will be within a predetermined future time, signal combining means, and means for applying said fourth and fifth output signals to said combining means, said combining means producing said alerting signal in response to said fifth output signal when the magnitude of said fourth output signal is below a predetermined value, and means for applying said control signal to said combining means for inhibiting the operation thereof.

References Cited in the file of this patent

UNITED STATES PATENTS

| | | |
|---|---|---|
| 2,554,893 | Brunn | May 29, 1951 |
| 2,933,726 | Campbell et al. | Apr. 19, 1960 |

FOREIGN PATENTS

| | | |
|---|---|---|
| 1,221,513 | France | Jan. 11, 1960 |